(No Model.)

E. D. AVERELL.
CELL CASE.

No. 429,406. Patented June 3, 1890.

Witnesses:-
D. N. Hayward
C. L. Sundgren

Inventor:-
Ellicott D. Averell
by his attorneys
Brown & Seward

UNITED STATES PATENT OFFICE.

ELLICOTT D. AVERELL, OF BROOKLYN, NEW YORK, ASSIGNOR OF ONE-HALF TO CHARLES M. DENNISON, OF SAME PLACE.

CELL-CASE.

SPECIFICATION forming part of Letters Patent No. 429,406, dated June 3, 1890.

Application filed April 19, 1890. Serial No. 348,665. (No model.)

*To all whom it may concern:*

Be it known that I, ELLICOTT D. AVERELL, of Brooklyn, in the county of Kings and State of New York, have invented a certain new and useful Improvement in Egg-Packers, of which the following is a specification.

My invention relates to an improvement in devices for packing and transporting eggs and other bodies subject to injury from breakage and bruising.

The object is to provide a simple and inexpensive device which will hold the bodies separated from one another by a yielding cushion, the cushion being so disposed that it will first receive the force of any impact either sidewise or endwise, and so effectually prevent the breakage of the body, and to further provide, in cases where it is found desirable, a free circulation of air around the greater portion of the body when in position and engagement with its cushion.

With these ends in view my improvement consists of certain features of construction and certain combinations of parts, as hereinafter described, and pointed out in the claims.

Figure 1:
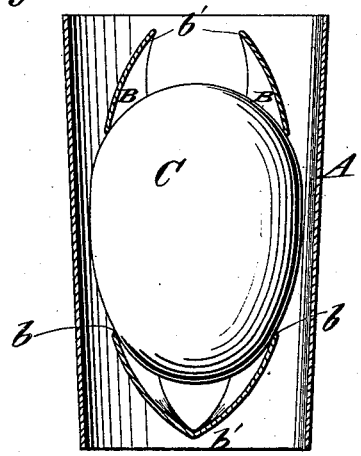
Figure 2:
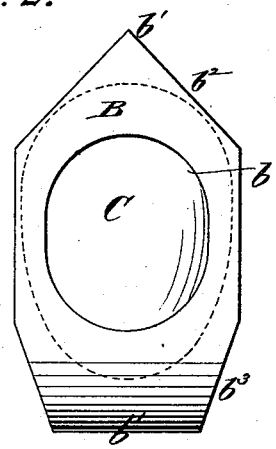
Figure 3:
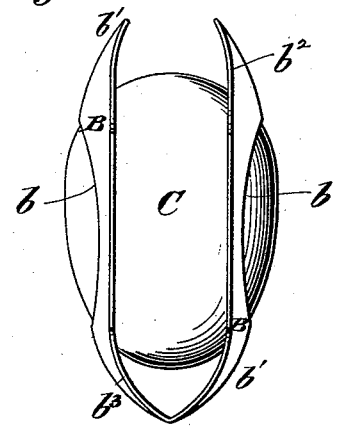
Figure 4:
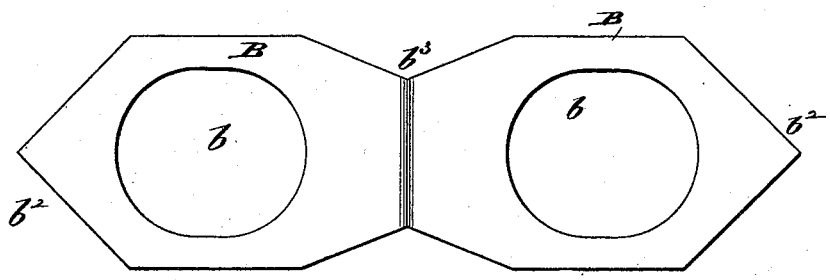

In the accompanying drawings, Figure 1 represents a vertical section of the device, showing an egg in position in its holder. Fig. 2 is a view of the inside cushion in side elevation, the position of the egg therein being denoted by dotted lines. Fig. 3 is an edge view of the same, and Fig. 4 is a view in detail of the inner cushion with its jaws spread open.

Similar letters of reference designate corresponding parts in all the figures.

My invention will be described with particular reference to packing eggs.

A represents a cell, which may be made of any suitable cheap material adapted for the purpose—such, for example, as common brown pasteboard. The cell is here shown as having a slight taper from bottom to top, and this form I prefer, as it tends to compress the jaws more snugly in their positions within it. The size of the cell A is intended to be somewhat greater in diameter than the shortest diameter of an egg C and its length is somewhat greater than the length of an egg, and is preferably left open at both ends. Of course the length and diameter of the cell may be varied to suit eggs which shall vary to any great extent in size.

To hold the egg within the cell A, I provide a pair of jaws B. In the form herein shown these jaws are formed in one piece, and they may be made of the same material—such, for example, as cheap brown pasteboard or any other suitable material. The said jaws are each provided with openings $b$ of a round or oval shape, preferably of slightly-oval shape, as herein shown, for the purpose of receiving a portion of the opposite sides of the egg when the jaws are folded about the egg, as shown in Fig. 3. The width of the jaws B is intended to be such that when they are folded about an egg and forced down within the cell A their edges will be slightly curved toward each other, and will press with an elastic pressure against the inner walls of the case, while the edges of their openings $b$ will press with an elastic pressure against the shell of the egg, so that the cells A may be packed side by side and in tiers one above another, with slight liability of any damage happening to the eggs so far as breaking their shells is concerned.

The pressure of the cells against one another, or against the sides of any ordinary packing-box in which they may be placed, is prevented from being imparted directly to the shell of the egg, because of the curved portions of the jaws B within the cell, the same serving as effective cushions in a lateral direction. It will be further observed that as the cells are opened at both ends and as the jaws are cut away above and below the ends of the egg, as shown particularly at $b^2$ and $b^3$, Fig. 4, there will be abundance of room for the free circulation of air throughout the cells around the eggs therein.

Although I have shown and described the transporting and packing device as applicable to the transportation of eggs, it is obvious that it might be employed to advantage in connection with fruits and other bodies which are liable to become injured by breakage or bruising.

What I claim as my invention, and desire to secure by Letters Patent, is—

1. The combination, with a cell, of flexible embracing-jaws adapted to be inserted within the cell and engage the side walls of the cell to compress the jaws above the body, substantially as described.

2. The combination, with an open-ended cell, of a pair of perforated flexible embracing-jaws fitted to be inserted within the cell and engage the side walls of the cell to compress the jaws about the body, substantially as herein described.

3. The combination, with a tapered cell, of a pair of embracing-jaws of flexible material perforated to receive the opposite sides of the body to be packed and fitted to be inserted within the cell, substantially as herein described.

4. The combination, with an open-ended cell, of a pair of folded jaws provided with projections for receiving the opposite sides of a body to be packed and protruding above and below the position which the body will occupy between them, the edges of said jaws being fitted to engage the sides of the cell when inserted therein with the body between them, substantially as herein described.

ELLICOTT D. AVERELL.

Witnesses:
F. G. BARRY,
K. E. PEMBLETON.

It is hereby certified that in Letters Patent No. 429,406, granted June 3, 1890, upon the application of Ellicott D. Averell, of Brooklyn, New York, for an improvement in "Cell-Cases," an error appears in the printed specification requiring correction, as follows: In line 9, page 2, the word "above" should be read *about*; and that the said Letters Patent should be read with this correction therein that the same may conform to the record of the case in the Patent Office.

Signed, countersigned, and sealed this 10th day of June, A. D. 1890.

[SEAL.]

CYRUS BUSSEY,
*Assistant Secretary of the Interior.*

Countersigned:
C. E. MITCHELL,
*Commissioner of Patents.*